US012597207B2

(12) United States Patent
Booth et al.

(10) Patent No.: US 12,597,207 B2
(45) Date of Patent: Apr. 7, 2026

(54) CAMERA REPROJECTION FOR FACES

(71) Applicant: Meta Platforms Technologies, LLC, Menlo Park, CA (US)

(72) Inventors: James Allan Booth, Zurich (CH); Elif Albuz, Los Gatos, CA (US); Peihong Guo, San Mateo, CA (US); Tong Xiao, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/498,919

(22) Filed: Oct. 31, 2023

(65) Prior Publication Data

US 2024/0078754 A1 Mar. 7, 2024

Related U.S. Application Data

(63) Continuation of application No. 18/145,592, filed on Dec. 22, 2022, now Pat. No. 11,842,442, which is a
(Continued)

(51) Int. Cl.
| | |
|---|---|
| *G06T 17/20* | (2006.01) |
| *G06T 7/73* | (2017.01) |
(Continued)

(52) U.S. Cl.
CPC ................ *G06T 17/20* (2013.01); *G06T 7/73* (2017.01); *G06T 15/04* (2013.01); *G06V 20/64* (2022.01);
(Continued)

(58) Field of Classification Search
CPC ............ G06T 15/04; G06T 7/73; G06T 17/20
See application file for complete search history.

(56) References Cited

U.S. PATENT DOCUMENTS

| | | |
|---|---|---|
| 8,228,315 B1 | 7/2012 | Starner et al. |
| 8,928,589 B2 | 1/2015 | Bi |
(Continued)

OTHER PUBLICATIONS

Green S., "Augmented Reality Keyboard for an Interactive Gesture Recognition System," Master in Computer Science Thesis, School of Computer Science and Statistics, Trinity College Dublin, May 2016, 76 pages.
(Continued)

*Primary Examiner* — Matthew Salvucci
(74) *Attorney, Agent, or Firm* — Greenberg Traurig, LLP

(57) ABSTRACT

In one embodiment, a computing system may access a first image of a first portion of a face of a user captured by a first camera from a first viewpoint and a second image of a second portion of the face captured by a second camera from a second viewpoint. The system may generate, using a machine-learning model and the first and second images, a synthesized image corresponding to a third portion of the face of the user as viewed from a third viewpoint. The system may access a three-dimensional (3D) facial model representative of the face and generate a texture image for the face by projecting at least the synthesized image onto the 3D facial model from a predetermined camera pose corresponding to the third viewpoint. The system may cause an output image to be rendered using at least the 3D facial model and the texture image.

18 Claims, 13 Drawing Sheets

Related U.S. Application Data continuation of application No. 17/028,927, filed on Sep. 22, 2020, now Pat. No. 11,562,535.

(51) Int. Cl.
| | |
|---|---|
| *G06T 15/04* | (2011.01) |
| *G06V 20/64* | (2022.01) |
| *G06V 40/16* | (2022.01) |

(52) U.S. Cl.
CPC .. *G06V 40/171* (2022.01); *G06T 2207/30244* (2013.01)

(56) References Cited

U.S. PATENT DOCUMENTS

| | | | |
|---|---|---|---|
| 11,270,515 | B2 | 3/2022 | Beith et al. |
| 2016/0070952 | A1 | 3/2016 | Kim et al. |
| 2018/0158246 | A1 | 6/2018 | Grau et al. |
| 2018/0336737 | A1 | 11/2018 | Varady et al. |
| 2020/0245873 | A1 | 8/2020 | Frank et al. |
| 2021/0007607 | A1* | 1/2021 | Frank ................. A61B 5/14552 |
| 2021/0142045 | A1* | 5/2021 | Noest .................. H04N 13/282 |

OTHER PUBLICATIONS

EPO—International Search Report and Written Opinion for International Application No. PCT/US2021/046060, mailed Nov. 30, 2021, 9 pages.

Wall Street Journal, "NEC Turns a Person's Arm into a Keyboard," Nov. 6, 2015, Retrieved from the Internet: URL: https://www.youtube.com/watch?v=MVDWG33YTsg, 2 pages.

\* cited by examiner

100

108

102

104

106

700
New Texture
708
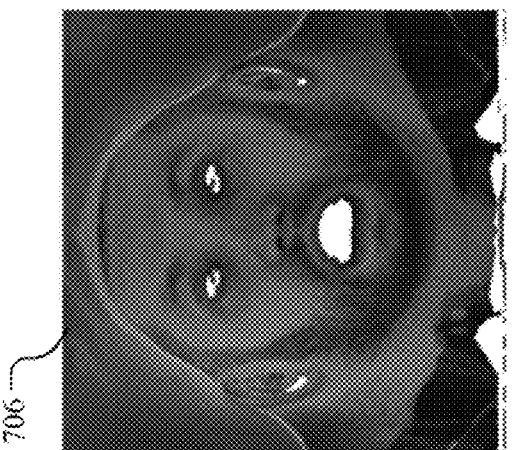
706
=
+
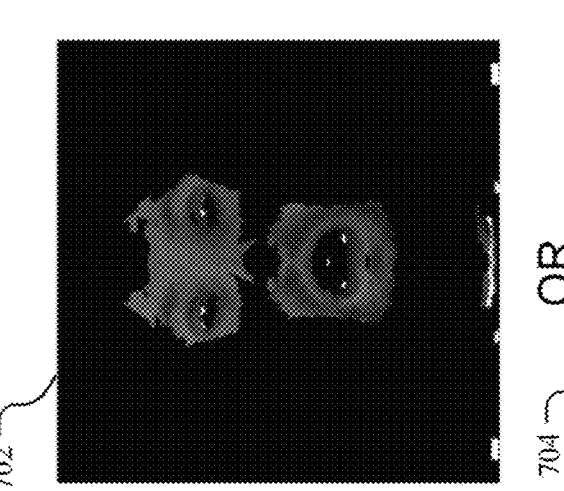
702
OR
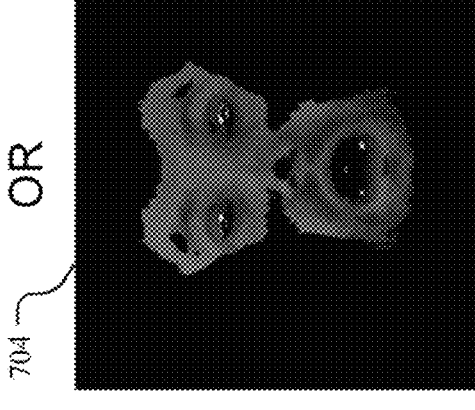
704
*FIG. 7A*

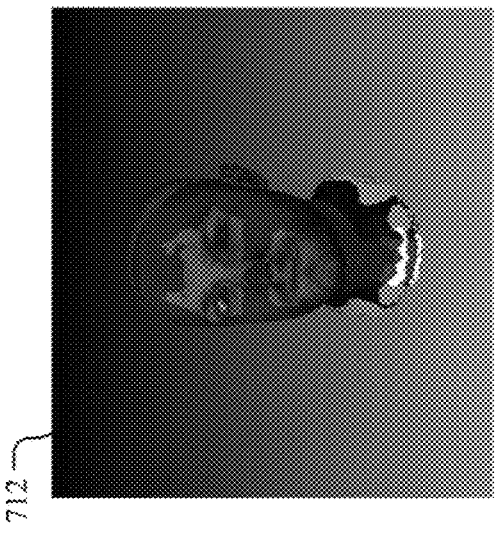
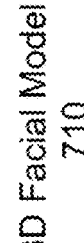
*FIG. 7B*

900

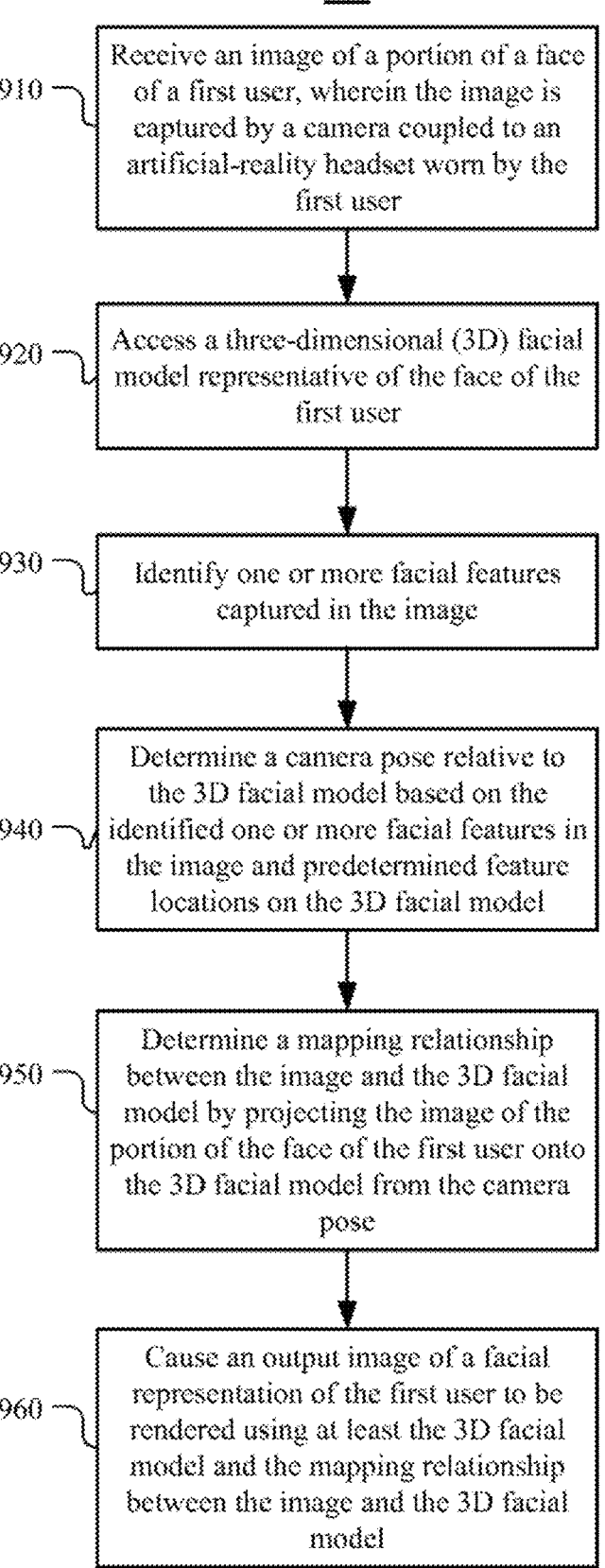

910 — Receive an image of a portion of a face of a first user, wherein the image is captured by a camera coupled to an artificial-reality headset worn by the first user 920 — Access a three-dimensional (3D) facial model representative of the face of the first user 930 — Identify one or more facial features captured in the image 940 — Determine a camera pose relative to the 3D facial model based on the identified one or more facial features in the image and predetermined feature locations on the 3D facial model 950 — Determine a mapping relationship between the image and the 3D facial model by projecting the image of the portion of the face of the first user onto the 3D facial model from the camera pose 960 — Cause an output image of a facial representation of the first user to be rendered using at least the 3D facial model and the mapping relationship between the image and the 3D facial model

*FIG. 9*

CAMERA REPROJECTION FOR FACES

PRIORITY

This application is a continuation under 35 U.S.C. § 120 of U.S. patent application Ser. No. 18/145,592, filed 22 Dec. 2022, which is a continuation under 35 U.S.C. § 120 of U.S. patent application Ser. No. 17/028,927, filed 22 Sep. 2020, each of which is incorporated herein by reference.

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interacting with a virtual (or augmented) reality environment. An artificial reality system may render an artificial environment, which may include a virtual space that is rendered for display to one or more users. For instance, a virtual reality environment may be rendered, or an augmented reality environment may be rendered. The users may view and interact within this virtual space and the broader virtual environment through any suitable means. One goal of the disclosed methods is to reproject a facial representation of a user within an artificial reality environment. In particular embodiments, one or more computing systems may provide a method of reprojecting a facial representation of a user within an artificial reality environment. To start, the one or more computing systems may receive one or more captured images of a portion of a face of a user. The captured images may be taken by an inside-out camera coupled to an artificial reality system worn by the user. The one or more computing systems may access a three-dimensional (3D) facial model representative of the face of the user. The one or more computing systems may identify facial features captured in the one or more images. The one or more computing systems may determine a camera pose relative to the 3D facial model based on the identified facial features and predetermined feature locations on the 3D facial model for each camera associated with the one or more captured images. After determining the camera pose(s), the one or more computing systems may determine a mapping relationship between the captured image(s) and the 3D facial model. To determine the mapping relationship, the one or more computing systems may project the captured image(s) of portions of the face of the user onto the 3D facial model from the determined camera pose. The one or more computing systems may cause an output image of a facial representation of a user to be rendered by using the 3D facial model and the mapping relationship between the captured image(s) and the 3D facial model. For instance, the one or more computing systems may send instructions to an artificial reality system of another user to render the facial representation of the user in an artificial reality environment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 7A-7B illustrates an example process of reprojecting a facial representation onto a three-dimensional model.

FIG. 9 illustrates an example method for reprojecting a facial representation onto a facial model.

DESCRIPTION OF EXAMPLE EMBODIMENTS

Figure 1:
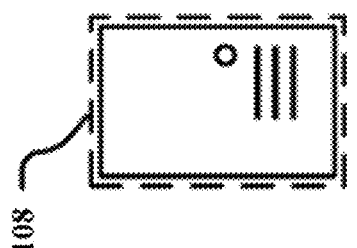
FIG. 1 illustrates an example artificial reality system.

As more people adopt artificial reality systems, more people will begin to use artificial reality systems for a variety of reasons. One use case may generally include face-to-face interactions. These face-to-face interactions may be within an augmented reality environment, virtual reality environment, and/or a combination of the two environments. For instance, avatars or visual representations (photorealistic or not) may be used to represent each user in a face-to-face interaction, such as a virtual meeting. Each user may be presented an environment where they can see other users in the face-to-face interaction. However, currently these artificial environments between users may not be able to capture the facial expressions of a user that people are accustomed to seeing in a typical face-to-face interaction. As such, a facial reprojection within a virtual reality environment may improve upon user experiences while interacting with other users in an artificial reality environment. However, that may not be a simple problem to solve when a user is wearing a virtual reality headset that occludes part of the user's face and images of the user's face are captured from extreme viewpoints. As such, facial models may be used to in conjunction with machine learning models to improve upon camera reprojection of faces within a virtual reality environment.

In particular embodiments, an artificial reality system may have one or more cameras that are capturing a user's facial features. As an example and not by way of limitation, a virtual reality headset may have multiple inside-out cameras that are capturing a user's facial features. These inside-out cameras may be used to capture the user's facial features (e.g., a portion of the user's mouth, a portion of the eyes, etc.). Landmarks in the images may be used to morph a facial model to customize it for the user, and the images may be used to create a texture for the corresponding portion of the facial model. As an example and not by way of limitation, there can be an average facial model that is representative of a person's face. When the user puts on the headset, the headset's cameras may capture images of the user's mouth region. Landmarks of the captured mouth region may be detected and matched against the facial model to determine the poses (position and orientation) of the cameras relative to the facial model. The captured images can be reprojected from the cameras onto the facial model to determine the mapping between the images and the geometry of the facial model (e.g., the images can be used as textures for the facial model). With the facial model, the static texture of the user's overall face, and the dynamic texture generated based on the captured images, the artificial reality system could render images of an avatar or photorealistic representation from desired viewpoints to represent the user's face in a virtual reality environment.

In particular embodiments, a machine-learning model may be used to synthesize an image of a portion of the user's face. While some cameras of an artificial reality headset may be able to capture portions of the face clearly, other cameras of the artificial reality headset may not be able to accurately capture the portion of the face clearly. This is especially true for facial features that have complex geometric details (e.g., eyes) and because of the viewpoints of the cameras may differ significantly from a desired rendering viewpoint. Using the cameras of an artificial reality headset, images may be captured from each of these cameras and inputted into a machine-learning model to generate an image representing a facial portion. As an example and not by way of limitation, one camera may capture the user's eye from one angle and another camera may capture the user's eye from a different angle. These separate images may be combined to generate a synthesized image of what it would look like from a frontal view of the eye. The machine-learning model may be trained using ground truth images taken from a desired frontal viewpoint. The synthesized image may be reprojected onto a mesh or three-dimensional (3D) facial model from the pose of the camera used by the ground truth images (e.g., if the ground truth images were taken by a camera that is directly in front of the user's face at 6", centered between the eyes, then the synthesized image would be reprojected from such a camera instead of the real cameras used to capture the images).

In particular embodiments, one or more computing systems may perform the processing as described herein. The one or more computing system may be embodied as a social-networking system, a third-party system, an artificial reality system, another computing system, and/or a combination of these computing systems. The one or more computing systems may be coupled to a plurality of artificial reality systems. The plurality of artificial reality systems may be embodied as an augmented reality headset, a virtual reality headset, or a hybrid reality headset, and the like. In particular embodiments, the one or more computing systems may receive input data from the plurality of artificial reality systems. In particular embodiments, the input data may comprise images captured from one or more cameras coupled to an artificial reality system.

In particular embodiments, the one or more computing systems may receive an image of a portion of a face of a user. In particular embodiments, the one or more computing systems may receive an image of a portion of a face of a user from an artificial reality system. The image may be captured by a camera coupled to the artificial reality system. As an example and not by way of limitation, the image may be captured by an inside-out camera of an artificial reality headset worn by a user, where the image may capture a portion of the user's mouth. The image may correspond to other portions of the face of the user based on the camera pose of the camera. In particular embodiments, the one or more computing systems may receive a plurality of images corresponding to one or more portions of the user's face from multiple cameras. As an example and not by way of limitation, the one or more computing systems may receive two images corresponding to the user's mouth and one image corresponding to the user's right eye from several inside-out cameras coupled to an artificial reality headset. In particular embodiments, multiple cameras may be coupled to an artificial reality system at various camera poses relative to the artificial reality system. As an example and not by way of limitation, a camera may be placed on the top portion of an artificial reality system and another camera may be placed on the bottom portion of the artificial reality system. Although this disclosure describes receiving an image of a portion of a face of a user in a particular manner, this disclosure contemplates receiving an image of a portion of a face of a user in any suitable manner.

In particular embodiments, the one or more computing systems may access a three-dimensional (3D) facial model representative of a face of a user. In particular embodiments, the one or more computing systems may retrieve a 3D facial model from storage or request a 3D facial model from another computing system. In particular embodiments, the one or more computing systems may select a 3D facial model based on the user. As an example and not by way of limitation, the one or more computing systems may identify characteristics of the user, such as requesting user input, and selecting a 3D facial model that best represents the user based on the user input. For instance, if a user inputs that he is six feet tall, African American, and of a slim build, then the one or more computing system may retrieve a 3D facial model that most accurately represents the user based on the user inputs. The one or more computing systems may use other factors to access an appropriate 3D facial model representative of the face of the user. In particular embodiments, the 3D facial model may be a predetermined 3D facial model representative of a plurality of faces of a plurality of users. As an example and not by way of limitation, a general 3D facial model may be used for all users, only males, or only females. In particular embodiments, the 3D facial model may represent a 3D space that a head of a user would occupy within an artificial reality environment. As an example and not by way of limitation, the 3D facial model may be a mesh on which textures can be applied to represent a face of a user. Although this disclosure describes accessing a 3D facial model representative of a face of a user in a particular manner, this disclosure contemplates accessing a 3D facial model representative of a face of a user in any suitable manner.

In particular embodiments, the one or more computing systems may identify one or more facial features captured in the image. In particular embodiments, the one or more computing systems may perform a process of facial feature detection to identify facial features captured in the image. As an example and not by way of limitation, the one or more computing systems may use a machine-learning model to identify a cheek and a nose captured within an image. In particular embodiments, a particular camera of artificial reality system may be designated to capture only certain features of a user's face. As an example and not by way of limitation, an inside-out camera coupled to the bottom of a virtual reality headset would only capture facial features located on the bottom of the user's face, so this particular inside-out camera may only identify a mouth or a chin. The particular inside-out camera may not be able to identify an eye for instance. This may reduce the number of features the particular inside-out camera is attempting to identify based on its position on the virtual reality headset. In particular embodiments, the one or more computing systems may morph a predetermined 3D facial model representative of a plurality of faces of a plurality of users based on at least the identified one or more facial features in the image. As an example and not by way of limitation, the one or more computing systems may identify based on the identified facial features that the face of the user is slightly narrower than the predetermined 3D facial model representative of a plurality of faces of a plurality of users and morph the 3D facial model accordingly so that the 3D facial model is representative of a facial model that pertains to the user. In particular embodiments, the one or more computing system may request an image of the face of the user. In particular embodiments, the one or more computing systems may identify privacy settings of the user to determine whether the one or more computing systems may access an image of the face of the user. As an example and not by way of limitation, if the user gives permission to the one or more computing systems, the one or more computing systems may access photos associated with the user through an online social network to retrieve an image representative of the face of the user. This retrieved image(s) may be analyzed to determine a static texture that is representative of the face of the user. As an example and not by way of limitation, the one or more retrieved images may be analyzed to determine where facial features are generally located on the face of the user. The analyzed images may be compared to the 3D facial model, and the 3D facial model may be morphed based on the analyzed images. Although this disclosure describes identifying one or more facial features captured in the image in a particular manner, this disclosure contemplates identifying one or more facial features captured in the image in any suitable manner.

In particular embodiments, the one or more computing systems may determine a camera pose relative to the 3D facial model. In particular embodiments, the one or more computing systems may use the identified one or more facial features in a captured image and predetermined feature locations on a 3D facial model in order to determine a camera pose. In particular embodiments, the one or more computing systems may compare locations of identified facial features captured in the image to predetermined feature locations. As an example and not by way of limitation, the one or more computing systems may identify a location of a chin and a location of a mouth of a user. The identified locations of the chin and mouth with respect to the camera and each other may be used to compare to predetermined feature locations of the 3D facial model. For instance, the chin and mouth may be located in a particular location in a captured image for a given camera pose. Given the identified locations of these facial features in the captured image, the one or more computing systems may determine where the camera pose is based on how the identified locations would compare to the predetermined feature locations. As an example and not by way of limitation, if a captured image contains a chin 30 pixels from the bottom of the captured image and 50 pixels from the left of the captured image and a mouth 60 pixels from the top of the captured image and 40 pixels from the right of the captured image, then the one or more computing systems may determine that the camera that captured the image may be at a particular camera pose with respect to the face of the user and the 3D facial model. Given that the heads of users will vary from person to person, the comparison of the identified facial features to the 3D facial model may allow the one or more computing systems to determine approximately the camera pose of the camera capturing the image relative to the 3D facial model. Although this disclosure describes determining a camera pose relative to the 3D facial model in a particular manner, this disclosure contemplates determining a camera pose relative to the 3D facial model in any suitable manner.

In particular embodiments, the one or more computing systems may determine a mapping relationship between a captured image and a 3D facial model. In particular embodiments, the one or more computing systems may determine the mapping relationship between an image and a 3D facial model by projecting the image of a portion of a face of a user onto the 3D facial model from the determined camera pose. As an example and not by way of limitation, the one or more computing systems may capture a portion of a face of a user, such as the mouth of a user. Since the camera pose of the camera that captured the image (e.g, an inside-out camera capturing the image of the mouth of the user) is not readily known, the one or more computing systems may determine the camera pose as described herein. By using the camera pose, the one or more computing systems may project the captured image onto the 3D facial model in order to determine a mapping relationship. For instance, which pixel of the captured image of the mouth of the user belongs at a particular location of the 3D facial model. The 3D facial model is used as a mesh to project the image of the mouth of the user onto 3D facial model. In particular embodiments, the mapping relationship may be a texture image of the portion of the face of the user. Although this disclosure describes determining a mapping relationship between a captured image and a 3D facial model in a particular manner, this disclosure contemplates determining a mapping relationship between a captured image and a 3D facial model in any suitable manner.

In particular embodiments, the computing system may cause an output image of a facial representation of the user to be rendered. In particular embodiments, the computing system may use at least the 3D facial model and the mapping relationship between a captured image and the 3D facial model to cause the rendering of an output image of a facial representation of the user. In particular embodiments, the one or more computing systems may send instructions to another computing system to render the output image of a facial representation of the user. As an example and not by way of limitation, the one or more computing systems may send instructions to an artificial reality system of a first user to render an output image of a facial representation of a second user. The one or more computing systems may initially receive one or more captured images of a face of the second user from the artificial reality system of the second user. The one or more computing systems may determine a mapping relationship between the image and a 3D facial model representative of the face of the second user as described herein. The one or more computing systems may send the mapping relationship between the one or more captured images and the 3D facial model to the artificial reality system of the first user. The artificial reality system of the first user may render the facial representation of the second user based on the received mapping relationship between the one or more captured images and the 3D facial model. In particular embodiments, a rendering package may be sent to an artificial reality system to render a facial representation of a user. The rendering package may contain the 3D facial model used and the mapping relationship between a captured image and the 3D facial model used. As an example and not by way of limitation, if the rendering package is used to render a facial representation of a second user, then the rendering package may include a 3D facial model of the second user and a texture image of the face of the second user. While the general process of reprojecting a face of a user is generally discussed in relation to a portion of the face of the user, the one or more computing systems may receive a plurality of images corresponding to various portions of the face of the user in order to create a texture image of the whole face of the user. As an example and not by way of limitation, the one or more computing systems may receive images of the eyes of a user, the mouth of the user, the nose of the user, the cheeks of the user, the forehead of the user, the chin of the user, and the like. Each of these images may be used to identify various facial features of the face of the user and determine mapping relationships corresponding to the image and a 3D facial model of the user. The mapping relationship may be used to project the full face of the user onto a 3D facial model. In particular embodiments, the output image of the facial representation of the user may be photorealistic so that it appears a user is looking at the face of another user. In particular embodiments, the output image of the facial representation of the user may be an avatar that is mapped according to the mapping relationship and the 3D facial model. As an example and not by way of limitation, the mapping relationship may be used to determine the current state of a face of a user (e.g., whether the user is smiling, frowning, moving their face in a certain way, and the like) and reproject that onto the avatar to represent the facial representation of the user. In particular embodiments, the rendering of an output image may be based on a viewpoint of the user of the artificial reality system that is rendering the facial representation with respect to the user whose face is being rendered. As an example and not by way of limitation, the facial representation of a user may consider in which direction another user is looking at another user in an artificial reality system. When a user is looking at another user directly, the rendered output image may be a facial representation of the user that is facing the other user. However, if the user is looking at the other user indirectly (e.g., from the side), the rendered output image may be a facial representation of the user from a side profile. Although this disclosure describes causing an output image of a facial representation of the user to be rendered in a particular manner, this disclosure contemplates causing an output image of a facial representation of the user to be rendered in any suitable manner.

In particular embodiments, the one or more computing systems may generate a synthesized image corresponding to a portion of the face of a user. In particular embodiments, the one or more computing systems may receive a plurality of images corresponding to a portion of the face of the user. As an example and not by way of limitation, the one or more computing systems may receive multiple images corresponding to the eyes of a user. In particular embodiments, the angles of cameras capturing images of a portion of the face of a user may be at extreme angles in relation to the face of the user. As an example and not by way of limitation, the camera may be located close to the face of a user. Given the extreme angle, a direct reprojection of the captured image mapped to a 3D facial model may not be an accurate facial representation and may introduce artifacts during the reprojection process. As such, in particular embodiments, a machine-learning model may be used to generate a synthesized image corresponding to one or more portions of the face of the user. As an example and not by way of limitation, given that the eyes portion of the face of a user is typically occluded by an artificial reality system (e.g., a virtual reality headset), multiple images of the eyes of the user at different angles may be compiled to generate a synthesized image of the eyes of the user. In particular embodiments, the machine-learning model may be trained based on ground truth images captured by a camera at a predetermined camera pose in relation to a face of a user. As an example and not by way of limitation, during a training process of a machine-learning model to synthesize multiple images to generate a texture or determine a mapping relationship between a synthesized image and a 3D facial model, images of the eyes of a user may be captured by an artificial reality system (e.g., captured by inside-out cameras of the artificial reality system). In a separate process, a camera at a predetermined camera pose may capture images of the eyes of the user in an unobstructed manner (e.g., the user is not wearing an artificial reality system), which would represent a ground truth image for the machine-learning model to compare to a rendered image. The machine-learning model may compare a rendered attempt (i.e., the synthesized image) of a portion of a face of a user based on the captured images to the ground truth image. By training the machine-learning model, the one or more computing systems may use the machine-learning model to synthesize multiple images to generate a synthesized image corresponding to a portion of a face of a user associated with the multiple images. When reprojecting a texture associated with the synthesized image, the texture may be projected onto a 3D facial model at the same camera pose of the camera that captured the ground truth image. As an example and not by way of limitation, the one or more computing systems may cause an output of a facial representation of a user to be rendered by at least projecting the synthesized image onto the 3D facial model from a predetermined camera pose. Although this disclosure describes generating a synthesized image corresponding to a portion of the face of a user in a particular manner, this disclosure contemplates generating a synthesized image corresponding to a portion of the face of a user in any suitable manner.

In particular embodiments, the one or more computing systems may blend a texture image with a predetermined texture. In particular embodiments, the texture image may be the mapping relationship between a captured image of a portion of a face of a user and a 3D facial model of the user. The texture image may be represented by an image to project onto a 3D facial model to represent the portion of a face of the user that corresponds to the texture image. As an example and not by way of limitation, if a captured image is of a right side of a mouth of a user, the texture image may represent the right side of a mouth of a user to project onto a 3D facial model. The projected texture image would be a part of a process of reprojecting the entire face of the user. For instance, the one or more computing systems would receive a captured image of the left side of the mouth of the user, the right cheek of the user, the left cheek of the user, and so on to determine a mapping relationship between the captured images to the 3D facial model to project each of the captured images onto the 3D facial model. In particular embodiments, a predetermined texture may be based on accessed images that the one or more computing systems may access based on privacy settings of the user. The predetermined texture may represent a static texture of the face of the user. As an example and not by way of limitation, the one or more computing systems may retrieve one or more images of the face of the user and generate and/or determine a static texture of the face of the user. The predetermined texture may represent what the face of the user typically looks like, such as where the facial features are located and the like. In particular embodiments, the one or more computing systems may blend the texture image with the predetermined texture. As an example and not by way of limitation, given a predetermined texture, the one or more computing systems may cause the projection of the texture image onto a 3D facial model with the predetermined texture to accurately reflect the face of a user at a current time. For instance, if a user is currently smiling, the texture image may correspond to the mouth of the user and the eyes of the user and be blended with a predetermined texture of the face of the user. The blended texture image with the predetermined image may be used to render a facial representation of the user that is smiling in an artificial reality environment. In particular embodiments, during the rendering process, the one or more computing systems may sample a point on a predetermined texture corresponding to a facial representation of a user to identify a first color associated with the point. As an example and not by way of limitation, the one or more computing systems may sample a pixel corresponding to the nose of the user to identify the color of the pixel corresponding to the nose. In particular embodiments, the one or more computing systems may sample another point on a texture image that corresponds to the point on the predetermined texture to identify another color associated with the point. As an example and not by way of limitation, the one or more computing systems may sample the same point on the texture image corresponding to the predetermined texture. For instance, if a point corresponding to a pixel of a nose is being sampled on the predetermined texture, the point corresponding to the same pixel of the nose is being sampled on the texture image. The colors of the samples corresponding to the predetermined texture and the texture image may be different. In particular embodiments, the one or more computing systems may blend the color corresponding to the sample from the predetermined texture with the color corresponding to the sample from the texture image to generate a final color associated with the location corresponding to the sample. As an example and not by way of limitation, if the sample of the predetermined texture is brown and the sample of the of the texture image is dark brown, the one or more computing systems may blend the colors and generate a final color that is between brown and dark brown.

FIG. 1 illustrates an example artificial reality system 100. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. As an example and not by way of limitation, the headset 104 may display visual artificial content and audio artificial reality content corresponding to a virtual meeting. The headset 104 may include one or more cameras which can capture images and videos of environments. The headset 104 may include a plurality of sensors to determine a head pose of the user 102. The headset 104 may include a microphone to receive audio input from the user 102. The headset 104 may be referred as a head-mounted display (HMD). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 2:
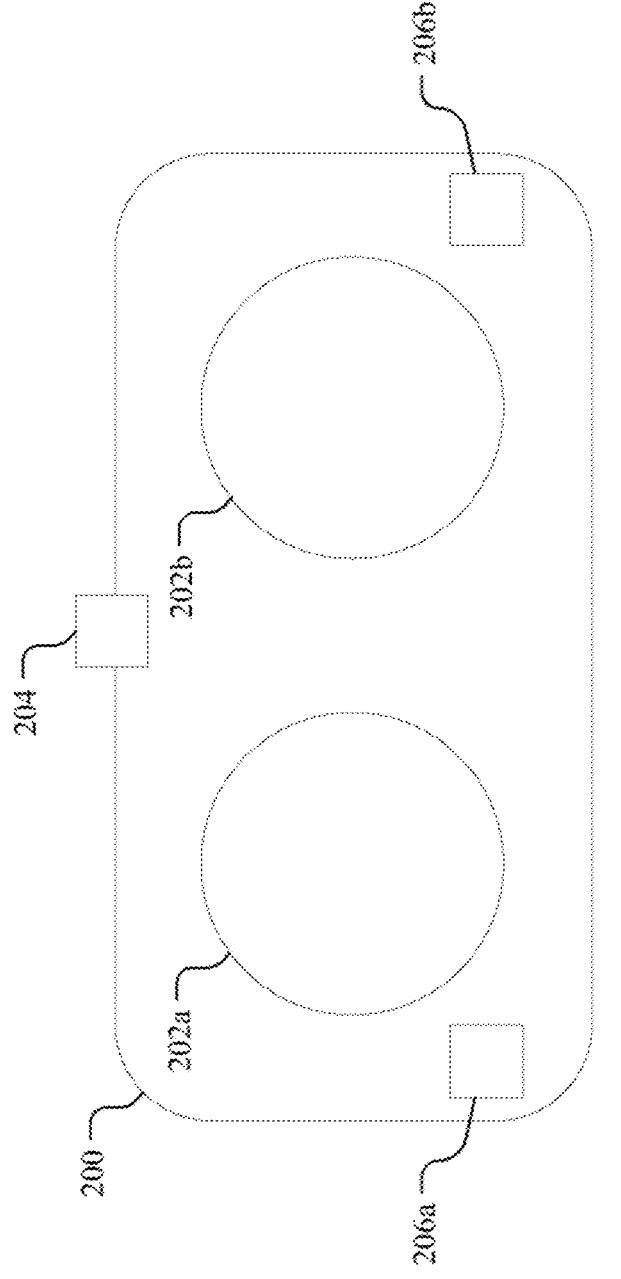
FIG. 2 illustrates another example artificial reality system.

FIG. 2 illustrates an example artificial reality system 200. The artificial reality system 200 may be worn by a user to display an artificial reality environment to the user. The artificial reality system may comprise displays 202*a*, 202*b* to display content to the user. As an example and not by way of limitation, the artificial reality system may generate an artificial reality environment of an office space and render an avatar of a user comprising a facial representation of the user. In particular embodiments, the artificial reality system may comprise a plurality of cameras 204, 206*a*, 206*b*. As an example and not by way of limitation, the artificial reality system 200 may comprise a plurality of inside-out cameras coupled to the artificial reality system 200 to capture images of various portions of the face of the user. As an example and not by way of limitation, the camera 204 may capture the top portion of the face of the user and part of the eyes of the user. In particular embodiments, the artificial reality system 200 may send the captured images from the plurality of cameras 204, 206*a*, 206*b* to another computing system. The computing system may process the captured images to send data (e.g., a mapping relationship, 3D facial model, and the like) to another artificial reality system 200 to render a facial representation of the user. While a certain number of components of artificial reality system 200 is shown, the artificial reality system 200 may comprise more or less components and/or in different configurations. As an example and not by way of limitation, the artificial reality system 200 may comprise an additional camera and the configuration of all of the cameras 204, 206*a*, 206*b* may change to accommodate the extra camera. For instance, there may be two additional cameras, and cameras 206*a*, 206*b* may be positioned closer to the displays 202*a*, 202*b*.

Figure 3:
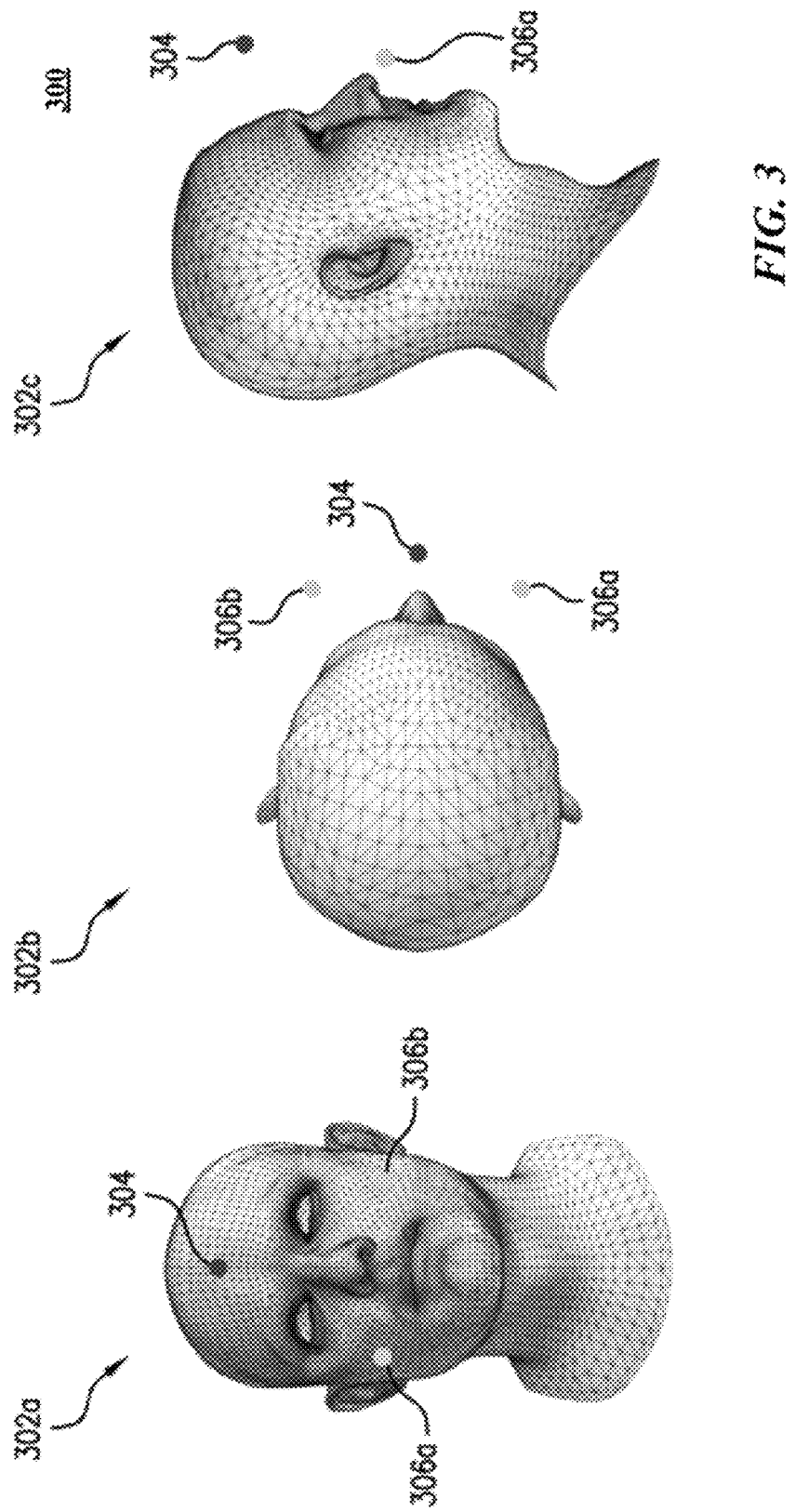
FIG. 3 illustrates example camera positions of an artificial reality system in relation to a user.

FIG. 3 illustrates an environment 300 representative of a plurality of cameras (e.g., such as cameras 204, 206*a*, 206*b* of artificial reality system 200) in relation to the face of a user. In particular embodiments, several angles 302*a*-302*c* display the distance between the multiple cameras 304, 306*a*, 306*b* in relation to the face of a user. In particular embodiments, the cameras 304, 306*a*, 306*b* may be coupled to an artificial reality system that is not shown. In particular embodiments, the various angles 302*a*-302*c* display the cameras 304, 306*a*, 306*b* at specific distances from the face of the user at specific camera poses. In particular embodiments, the several angles 302*a*-302*c* portray approximate distances between the cameras 304, 306*a*, 306*b* in relation to the face of the user. While the cameras 304, 306*a*, 306*b* are shown to be configured in a certain way, the cameras 304, 306*a*, 306*b* may be reconfigured in a different way. As an example and not by way of limitation, cameras 306*a*, 306*b* may be positioned lower in relation to the face of the user and closer to the face of the user. As another example and not by way of limitation, there may be additional cameras and cameras 304, 306*a*, 306*b* may be repositioned to accommodate the additional cameras.

Figure 4:
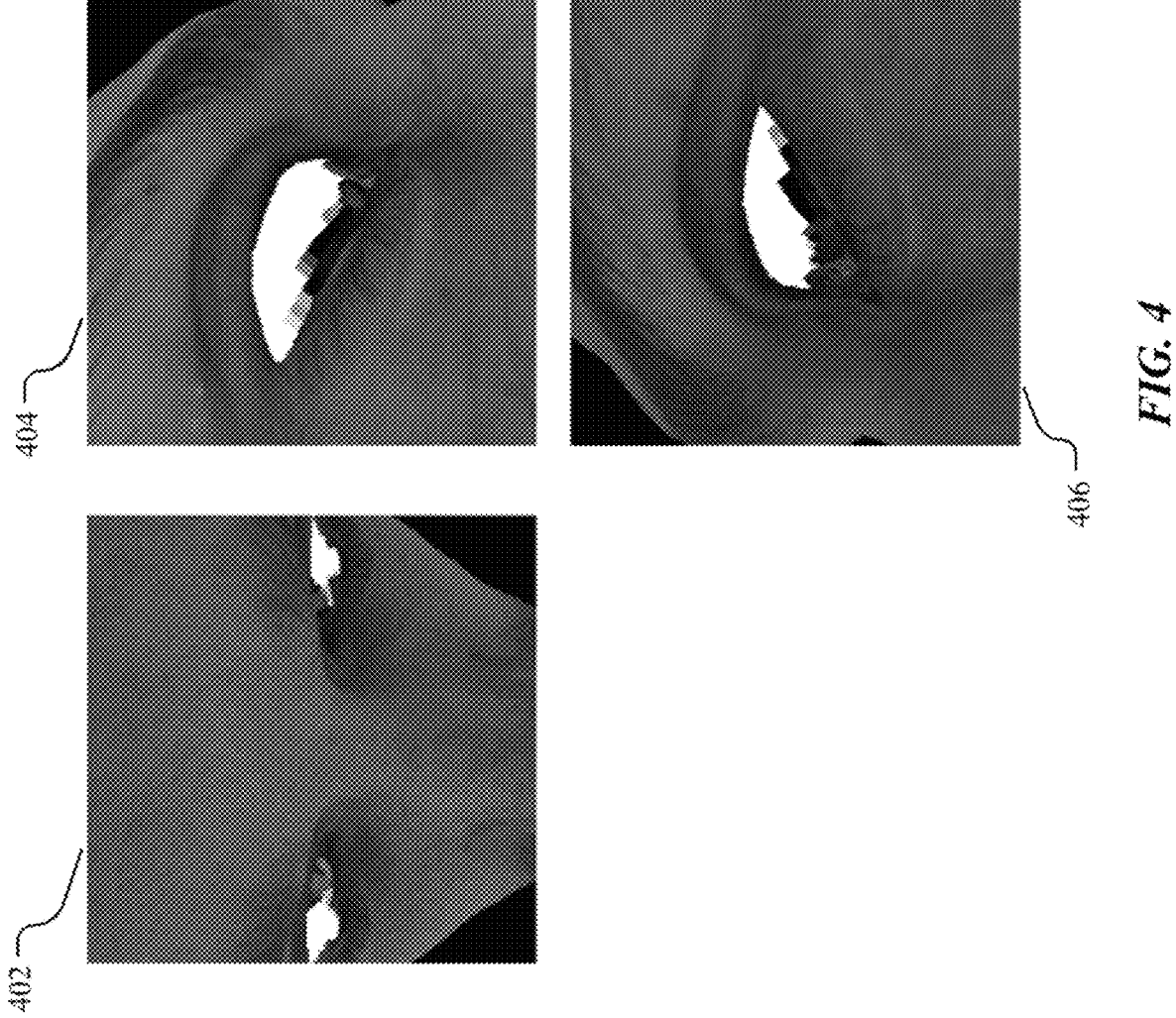
FIG. 4 illustrates example images captured by cameras of an artificial reality system.

FIG. 4 illustrates example images captured by cameras of an artificial reality system. As an example and not by way of limitation, the example images may be captured by cameras 304, 306*a*, 306*b* of FIG. 3. In particular embodiments, camera 304 may capture image 402 of a portion of a face of the user. In particular embodiments, the image 402 may correspond to the top portion of the face of the user. In particular embodiments, camera 306*a* may capture image 404 of a portion of a face of the user. In particular embodiments, the image 404 may correspond to a right eye of the user. In particular embodiments, camera 306*b* may capture image 406 of a portion of a face of the user. In particular embodiments, the image 406 may correspond to a left eye of the user. While the images 402, 404, 406 are shown to correspond to particular portions of a face of a user, the images 402, 404, 406 may correspond to different portions of the face of the user based on the corresponding camera associated with the image 402, 404, 406. In particular embodiments, there may any number of images that correspond to a portion of a face of the user. As an example and not by way of limitation, there may be three cameras positioned on the right side of the face of the user to capture three images that correspond to the right side of the face of the user.

Figure 5A:
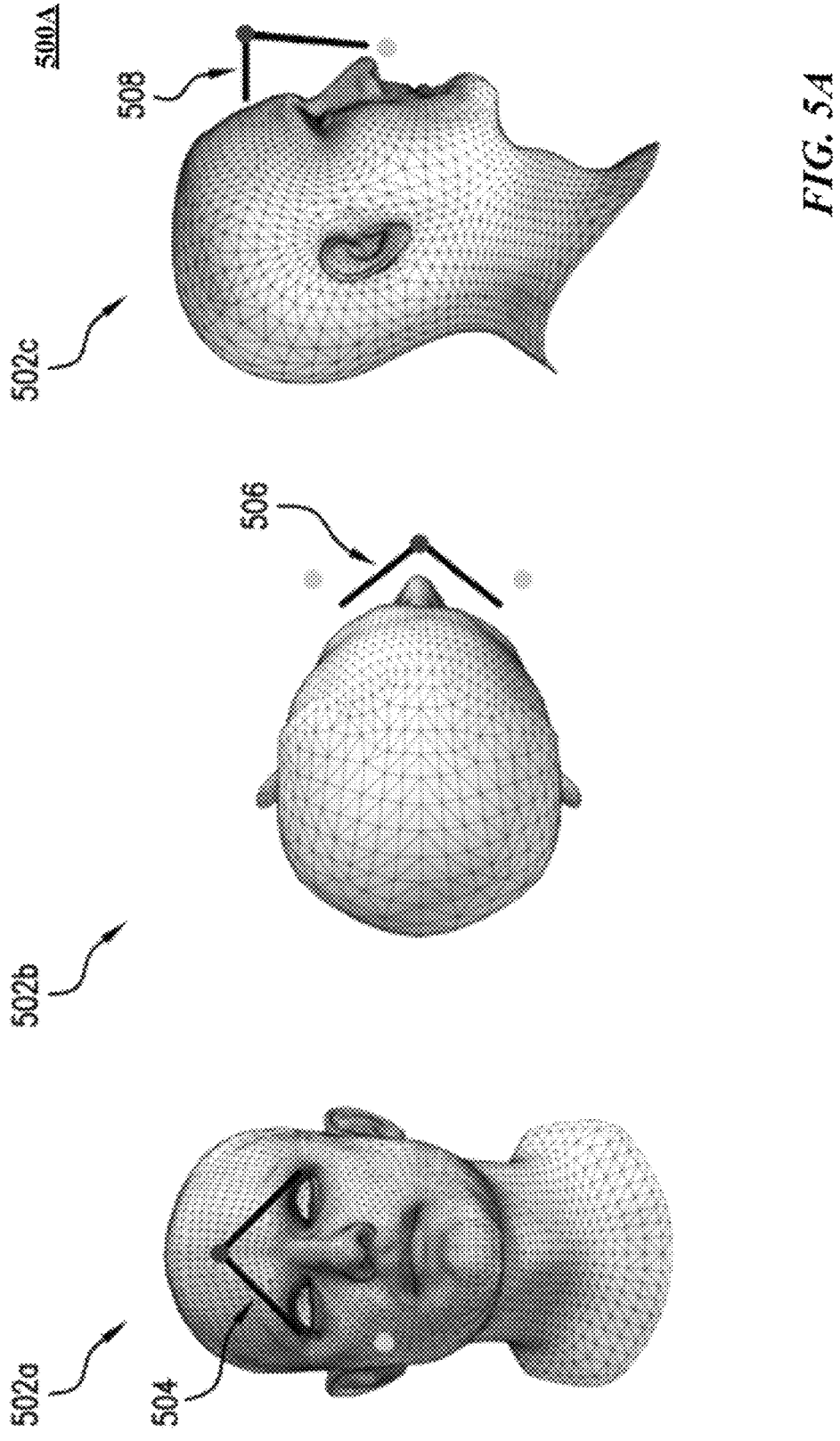
FIGS. 5A-5B illustrate example areas of reprojection from a camera of an artificial reality system.
Figure 5B:
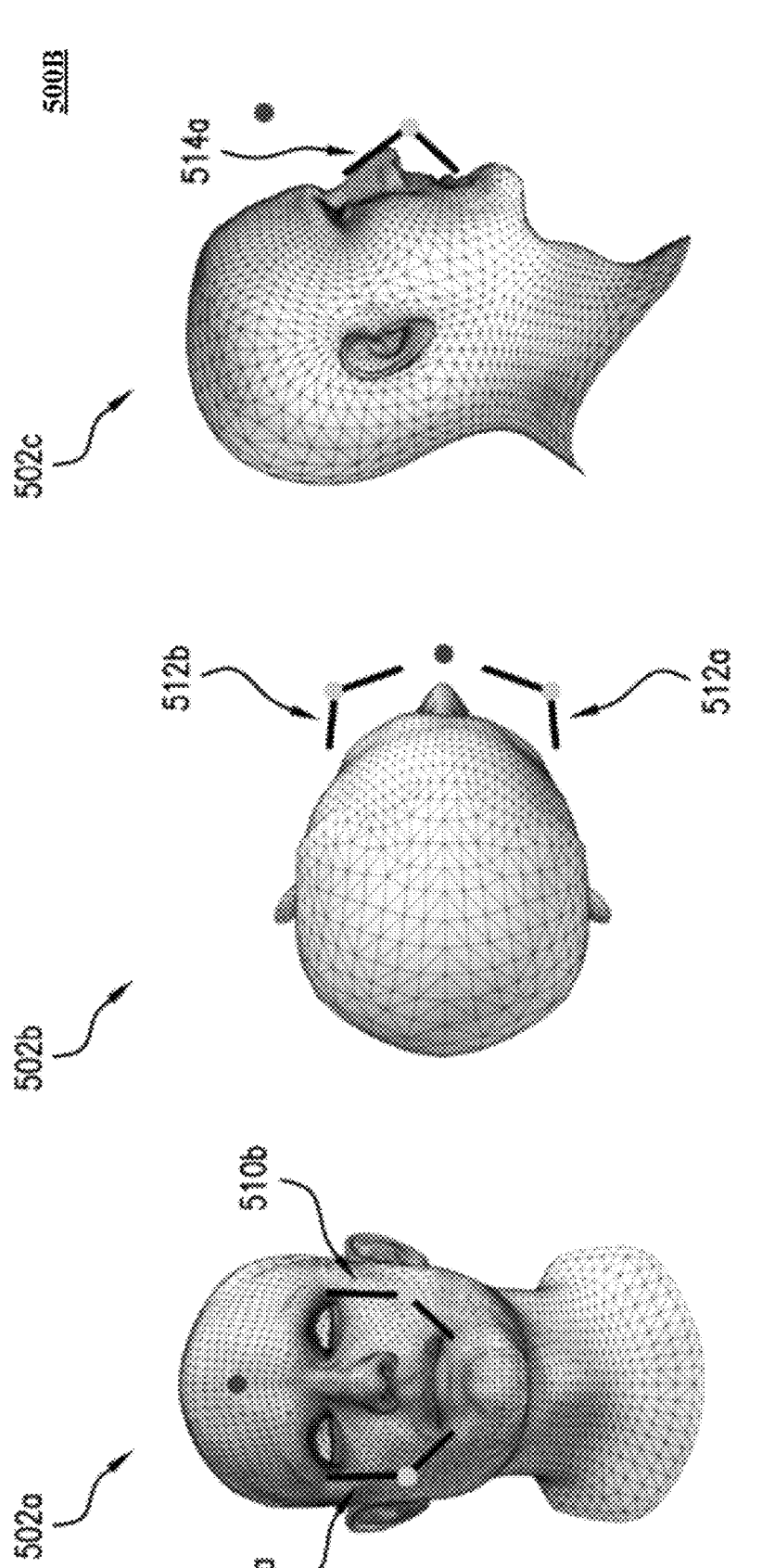

FIGS. 5A-5B illustrate example areas of reprojection from a camera of an artificial reality system. In particular embodiments, an environment 500A and an environment 500B each representative of a plurality of cameras (e.g., such as cameras 204, 206*a*, 206*b* of artificial reality system 200) in relation to the face of a user is shown. Referring to FIG. 5A, example areas of reprojection from camera (e.g., camera 204) are shown within an environment 500A representative of a plurality of cameras in relation to the face of a user. In particular embodiments, several angles 502*a*-502*c* of the areas of reprojection are shown. In particular embodiments, at a given angle 502*a*, the area of reprojection 504 of a camera (e.g., camera 204) may include an area between the cheeks of the user. In particular embodiments, at a given angle 502*b*, the area of reprojection 506 of a camera (e.g., camera 204) may include an area slightly encompassing the nose of the user. In particular embodiments, at a given angle 502*c*, the area of reprojection 508 of a camera (e.g., camera 204) may include an area from the forehead of the user to the tip of the nose of the user. In particular embodiments, the areas of reprojection 504, 506, 508 may all correspond to the same area of reprojection except that the area of reprojection is shown at the different angles 502*a*-502*c*. In particular embodiments, after one or more computing systems determines a mapping relationship between the captured image, such as a mapping relationship between image 402 to a 3D facial model or mesh as shown in FIG. 5A, then the one or more computing systems may cause an artificial reality system to render a facial representation of a face of a user by projecting the texture image onto the area of reprojection 504, 506, 508 corresponding to the camera that captured the image. Although example areas of reprojection 504, 506, 508 are shown for the particular camera, the camera may have different areas of reprojection. As an example and not by way of limitation, the camera may have a wider field of view and include a larger area of reprojection. As another example and not by way of limitation, if there are additional cameras, then the area of reprojection may be smaller.

Referring to FIG. 5B, example areas of reprojection from cameras (e.g., cameras 206*a*, 206*b*) are shown within an environment 500B representative of a plurality of cameras in relation to the face of a user. In particular embodiments, several angles 502*a*-502*c* of the areas of reprojection are shown. In particular embodiments, at a given angle 502*a*, the areas of reprojection 510*a*, 510*b* of cameras (e.g., camera 206*a*, 206*b*) may include areas corresponding to both eyes of the user. In particular embodiments, at a given angle 502*b*, the areas of reprojection 512*a*, 512*b* of cameras (e.g., camera 206*a*, 206*b*) may include areas between the nose of the user and the eyes of the user. In particular embodiments, at a given angle 502*c*, the areas of reprojection 514*a*, 514*b* (only area of reprojection 514*a* is shown) of cameras (e.g., camera 206*a*, 206*b*) may include areas from the top of the eyes to the bottom of the eyes of the user. In particular embodiments, the areas of reprojection 510*a*, 510*b*, 512*a*, 512*b*, 514*a*, 514*b* may all correspond to the same area of reprojection except that the area of reprojection is shown at the different angles 502*a*-502*c*. In particular embodiments, after one or more computing systems determines a mapping relationship between the captured images, such as a mapping relationship between images 404, 406 to a 3D facial model or mesh as shown in FIG. 5B, then the one or more computing systems may cause an artificial reality system to render a facial representation of a face of a user by projecting the texture images onto the areas of reprojection 510a, 510b, 512a, 512b, 514a, 514b corresponding to the camera that captured the image. Although example areas of reprojection 510a, 510b, 512a, 512b, 514a, 514b are shown for the particular camera, the camera may have different areas of reprojection. As an example and not by way of limitation, the camera may have a wider field of view and include a larger area of reprojection. As another example and not by way of limitation, if there are additional cameras, then the area of reprojection may be smaller.

Figure 6:
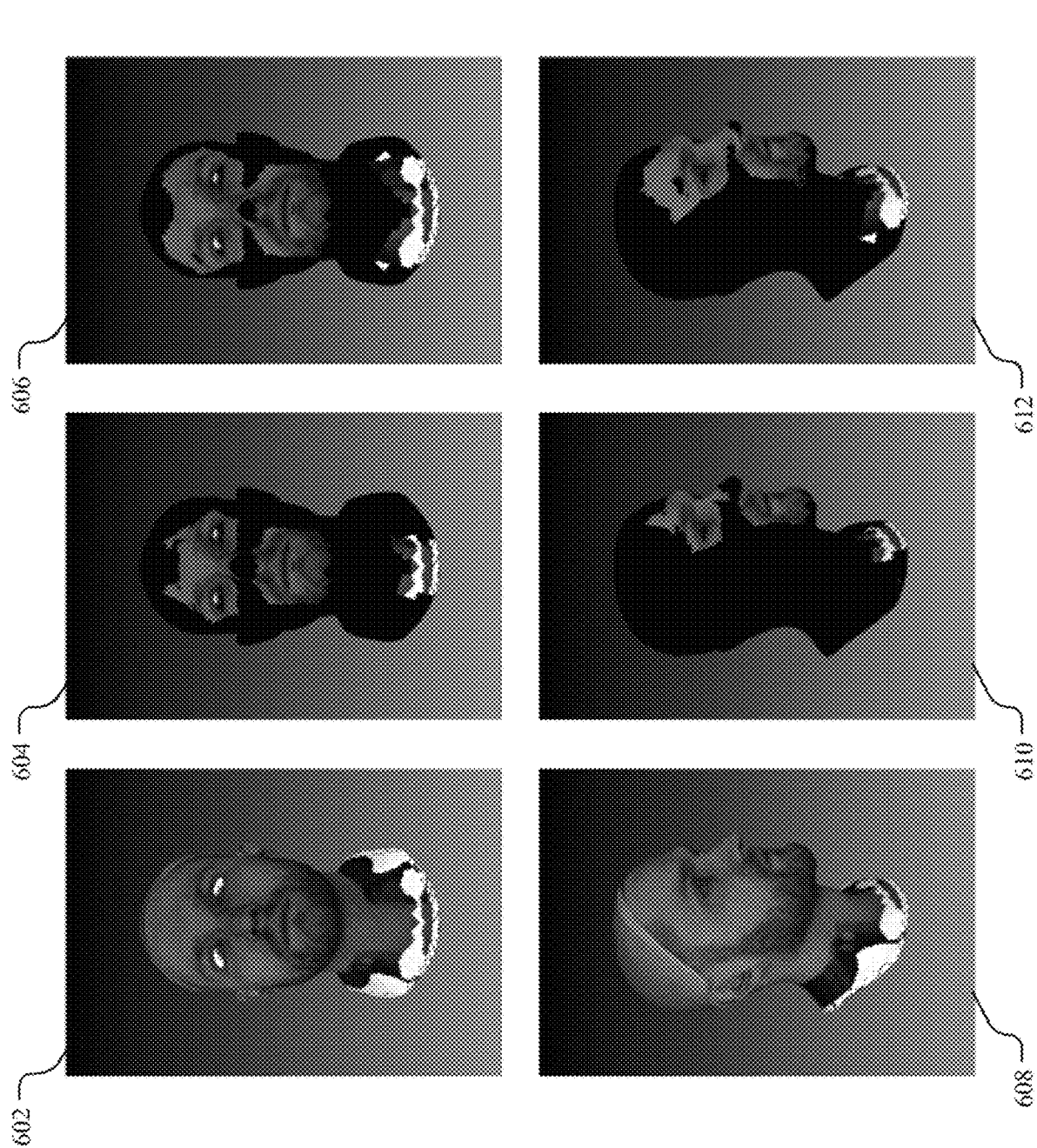
FIG. 6 illustrates example rendered two-dimensional images of a three-dimensional model from different perspectives.

FIG. 6 illustrates example rendered two-dimensional (2D) images of a 3D model from different perspectives. In particular embodiments, image 602 may represent a real-world view of a face of a user. In particular embodiments, image 604 may represent an example 2D rendered image based on the face shown in image 602 and using cameras with a narrow field of view. As an example and not by way of limitation, multiple cameras may capture images of various portions of the face of the user. These captured images may be used to determine a mapping relationship or a texture image shown in image 604. In particular embodiments, image 606 may represent an example 2D rendered image based on the face shown in image 602 and using cameras with a wider field of view. In particular embodiments, image 608 may represent another real-world view of a face of a user. In particular embodiments, image 610 may represent an example 2D rendered image based on the face shown in image 608 and using cameras with a narrow field of view. In particular embodiments, image 612 may represent an example 2D rendered image based on the face shown in image 608 and using cameras with a wider field of view.

FIGS. 7A-7B illustrates an example process 700 of reprojecting a facial representation onto a 3D model. Referring to FIG. 7A, in particular embodiments, the process 700 may begin with either a texture image 702 or texture image 704 determined from captured images and a 3D facial model 710 as described herein. In particular embodiments, the texture image 702 or 704 may be blended with a predetermined texture 706. The predetermined texture 706 may be generated based on images of a face of a user as described herein. In particular embodiments, the blending of the texture image 702 or 704 with the predetermined texture 706 may generate a new texture 708. Referring to FIG. 7B, the process 700 may continue by projecting the new texture 708 onto the 3D facial model 710. In particular embodiments, the result of projecting the new texture 708 onto the 3D facial model 710 may be the image 712 where a facial representation of the user is shown with the new texture 708 projected onto the 3D facial model 710. In particular embodiments, the blend between the texture image 702 or 704 with predetermined texture 706 is noticeable. In particular embodiments, during the reprojection process 700, the artificial reality system rendering the facial representation may blend the texture image 702 or 704 with predetermined texture 706 in such a way that removes the sharp contrast between the two textures.

Figure 8:
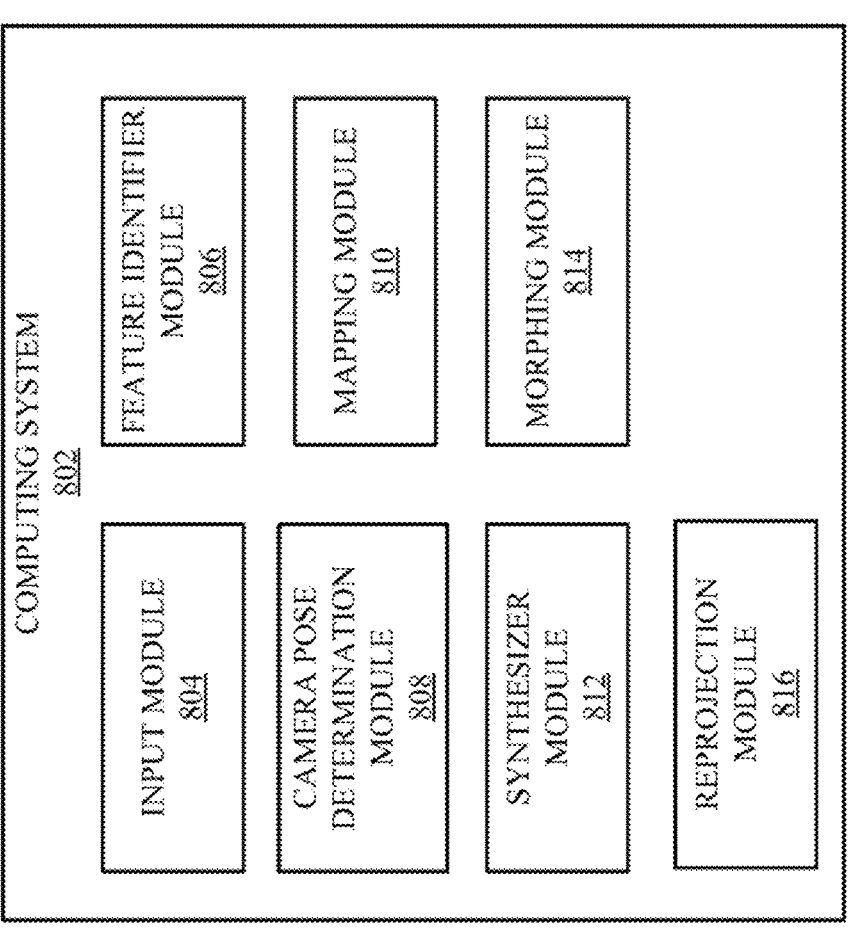
FIG. 8 illustrates an example computing system in an artificial reality environment.

FIG. 8 illustrates an example computing system 802 in an artificial reality environment 800. In particular embodiments, the computing system 802 may be embodied as an augmented reality headset, virtual reality headset, a server, a social-networking system, a third-party system, or a combination thereof. Although shown as an individual computing system 802, the computing system 802 may be represented by one or more computing systems as described herein. In particular embodiments, the computing system 802 may interface one or more artificial reality systems (e.g., an augmented reality headset, virtual reality, headset, and the like). In particular embodiments, the computing system 802 may comprise an input module 804, a feature identifier module 806, a camera pose determination module 808, a mapping module 810, a synthesizer module 812, a morphing module 814, and a reprojection module 816.

In particular embodiments, the input module 804 may interface one or more artificial reality systems in an artificial reality environment 800 to receive input data. In particular embodiments, the input data may be embodied as captured images from one or more artificial reality systems. As an example and not by way of limitation, an artificial reality system may capture images of portions of a face of a user from inside-out cameras and send the captured images to the computing system 802 as described herein. The input module 804 may send the captured images to the other modules of the computing system 802. As an example and not by way of limitation, the input module 804 may send the input data to the feature identifier module 806, mapping module 810, and/or synthesizer module 812.

In particular embodiments, the feature identifier module 806 may identify one or more facial features from the input data received from the input module 804. In particular embodiments, the feature identifier module 806 may perform a facial feature identification process. In particular embodiments, the feature identifier module 806 may use a machine-learning model to identify one or more facial features within a captured image. In particular embodiments, the captured image may be associated with a particular camera. As an example and not by way of limitation, the captured image may be associated with (e.g., captured by) the top camera coupled to an artificial reality system. The feature identifier module 806 may use the information to reduce the number of facial features to identify. As an example and not by way of limitation, if the captured image came from the top camera, the feature identifier module 806 would attempt to identify facial features corresponding to the eyes of a user, a nose of a user, and other facial features located on the top half of the face of the user. In particular embodiments, the feature identifier module may identify a location associated with the identified facial feature. In particular embodiments, the feature identifier module 806 may send the results of the feature identification process to other modules of the computing system 802. As an example and not by way of limitation, the feature identifier module 806 may send the results to the camera pose determination module 808 and/or morphing module 814.

In particular embodiments, the camera pose determination module 808 may determine the camera pose of the camera that captured the image associated with the identified facial features results sent by the feature identifier module 806. In particular embodiments, the camera pose determination module 808 may access a 3D facial model of a user as described herein. The camera pose determination module 808 may compare the locations of the identified facial features of the captured image to predetermined feature locations of the 3D facial model in order to determine the camera pose corresponding to the captured image. In particular embodiments, if the camera pose determination module 808 received multiple facial feature results corresponding to multiple cameras, the camera pose determination module 808 may determine the camera poses of each of the cameras that captured images sent to the computing system.

After determining the camera pose(s), the camera pose determination module 808 may send the determined camera pose(s) associated with one or more captured images to other modules of the computing system 802. As an example and not by way of limitation, the camera pose determination module 808 may send one or more determined camera poses to a mapping module 810.

In particular embodiments, the mapping module 810 may determine a mapping relationship between a captured image from an input module 804 and a 3D facial model of a face of a user by projecting the captured image onto the 3D facial model from the determined camera pose corresponding to the captured image. In particular embodiments, the mapping module 810 may project multiple captured images onto the 3D facial model to determine a mapping relationship between captured images and a 3D facial model. In particular embodiments, the mapping module 810 may send the determined mapping relationship to other modules of the computing system 802. As an example and not by way of limitation, the mapping module 810 may send the mapping relationship to a reprojection module 816.

In particular embodiments, the synthesizer module 812 may receive input data from the input module 804 corresponding to multiple images of a portion of a face of a user. As an example and not by way of limitation, the synthesizer module 812 may receive multiple images of the eyes of a user. In particular embodiments, the synthesizer module 812 may synthesize the multiple images into a synthesized image as described herein. The synthesize module 812 may send the synthesized image to the other modules of the computing system 802. As an example and not by way of limitation, the synthesizer module 812 may send the synthesized image to the reprojection module 816 and/or to the mapping module 810. In particular embodiments, the mapping module 810 may determine a mapping relationship between the synthesized image and the 3D facial model as described herein.

In particular embodiments, the morphing module 814 may receive identified facial feature results from the feature identifier module 806. In particular embodiments, the morphing module 814 may access a 3D facial model representative of a face of a user. In particular embodiments, the morphing module 814 may morph the 3D facial model as described herein. As an example and not by way of limitation, the morphing module 814 may use the identified facial features compared to the 3D facial model to determine whether the 3D facial model needs to be morphed. For instance, if the morphing module 814 determines that nose of the user is 3 inches away from the chin and the 3D facial model has a distance of 2.7 inches between the nose and the chin, the morphing module 814 may morph the 3D facial model to change the distance between the nose and chin of the 3D facial model to 3 inches. In particular embodiments, the morphing module 814 may send the results of a morphed 3D facial model to the other modules of the computing system 802. As an example and not by way of limitation, the morphing module 814 may send the morphed 3D facial model to the mapping module 810 and/or the reprojection module 816. In particular embodiments, the mapping module 810 may use the morphed 3D facial model to determine a mapping relationship between a captured image and the morphed 3D facial model instead of the original 3D facial model.

In particular embodiments, the reprojection module 816 may receive a mapping relationship from the mapping module. In particular embodiments, the reprojection module 816 may interface one or more artificial reality systems. In particular embodiments, the reprojection module 816 may generate instructions to cause an artificial reality system to render an output image of a facial representation of a user based on the mapping relationship between a captured image and 3D facial model (morphed or not morphed). In particular embodiments, the reprojection module 816 may generate a reprojection package to send to an artificial reality system, the reprojection package may include the mapping relationship, the 3D facial model of the user, and instructions to render the facial representation of the user based on the mapping relationship and the 3D facial model.

FIG. 9 illustrates an example method 900 for reprojecting a facial representation onto a facial model. The method 900 may begin at step 910, where one or more computing systems may receive an image of a portion of a face of a first user. In particular embodiments, the image may be captured by a camera coupled to an artificial-reality headset worn by the first user. At step 920, the one or more computing systems may access a three-dimensional (3D) facial model representative of the face of the first user. At step 930, the one or more computing systems may identify one or more facial features captured in the image. At step 940, the one or more computing systems may determine a camera pose relative to the 3D facial model based on the identified one or more facial features in the image and predetermined feature locations on the 3D facial model. At step 950, the one or more computing systems may determine a mapping relationship between the image and the 3D facial model by projecting the image of the portion of the face of the first user onto the 3D facial model from the camera pose. At step 960, the one or more computing systems may cause an output image of a facial representation of the first user to be rendered using at least the 3D facial model and the mapping relationship between the image and the 3D facial model. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for reprojecting a facial representation onto a facial model, including the particular steps of the method of FIG. 9, this disclosure contemplates any suitable method of reprojecting a facial representation onto a facial model, including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
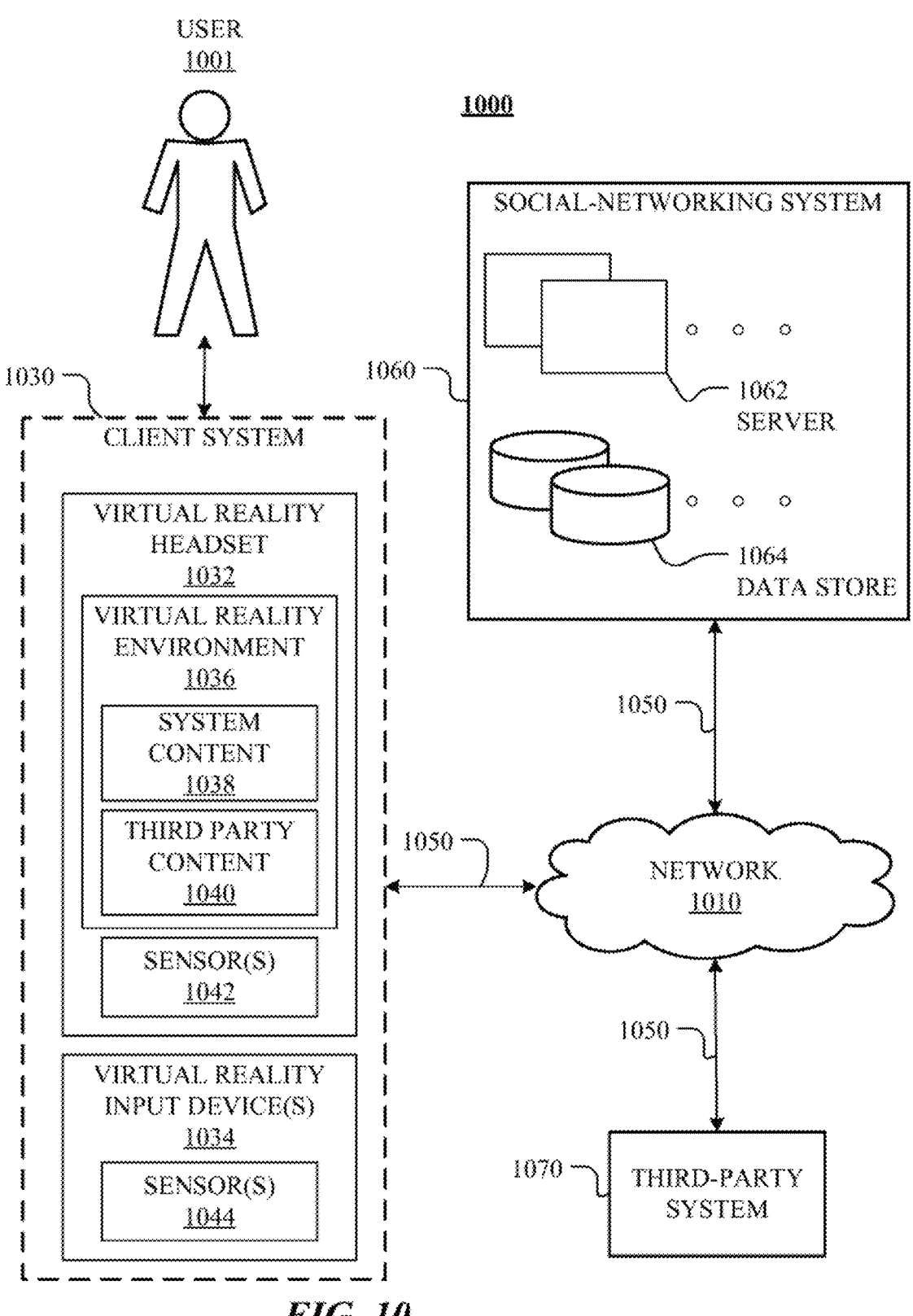
FIG. 10 illustrates an example network environment associated with a virtual reality system.

FIG. 10 illustrates an example network environment 1000 associated with a virtual reality system. Network environment 1000 includes a user 1001 interacting with a client system 1030, a social-networking system 1060, and a third-party system 1070 connected to each other by a network 1010. Although FIG. 10 illustrates a particular arrangement of a user 1001, a client system 1030, a social-networking system 1060, a third-party system 1070 and a network 1010, this disclosure contemplates any suitable arrangement of a user 1001, a client system 1030, a social-networking system 1060, a third-party system 1070, and a network 1010. As an example and not by way of limitation, two or more of a user 1001, a client system 1030, a social-networking system 1060, and a third-party system 1070 may be connected to each other directly, bypassing a network 1010. As another example, two or more of a client system 1030, a social-networking system 1060, and a third-party system 1070 may be physically or logically co-located with each other in whole or in part. Moreover, although FIG. 10 illustrates a particular number of users 1001, client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple users 1001, client systems 1030, social-networking systems 1060, third-party systems 1070, and networks 1010.

This disclosure contemplates any suitable network 1010. As an example and not by way of limitation, one or more portions of a network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 1010 may include one or more networks 1010.

Links 1050 may connect a client system 1030, a social-networking system 1060, and a third-party system 1070 to a communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout a network environment 1000. One or more first links 1050 may differ in one or more respects from one or more second links 1050.

In particular embodiments, a client system 1030 may be an electronic device including hardware, software, or embedded logic components or a combination of two or more such components and capable of carrying out the appropriate functionalities implemented or supported by a client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 1030. A client system 1030 may enable a network user at a client system 1030 to access a network 1010. A client system 1030 may enable its user to communicate with other users at other client systems 1030. A client system 1030 may generate a virtual reality environment for a user to interact with content.

In particular embodiments, a client system 1030 may include a virtual reality (or augmented reality) headset 1032 and virtual reality input device(s) 1034, such as a virtual reality controller. A user at a client system 1030 may wear the virtual reality headset 1032 and use the virtual reality input device(s) to interact with a virtual reality environment 1036 generated by the virtual reality headset 1032. Although not shown, a client system 1030 may also include a separate processing computer and/or any other component of a virtual reality system. A virtual reality headset 1032 may generate a virtual reality environment 1036, which may include system content 1038 (including but not limited to the operating system), such as software or firmware updates and also include third-party content 1040, such as content from applications or dynamically downloaded from the Internet (e.g., web page content). A virtual reality headset 1032 may include sensor(s) 1042, such as accelerometers, gyroscopes, magnetometers to generate sensor data that tracks the location of the headset device 1032. The headset 1032 may also include eye trackers for tracking the position of the user's eyes or their viewing directions. The client system may use data from the sensor(s) 1042 to determine velocity, orientation, and gravitation forces with respect to the headset. Virtual reality input device(s) 1034 may include sensor(s) 1044, such as accelerometers, gyroscopes, magnetometers, and touch sensors to generate sensor data that tracks the location of the input device 1034 and the positions of the user's fingers. The client system 1030 may make use of outside-in tracking, in which a tracking camera (not shown) is placed external to the virtual reality headset 1032 and within the line of sight of the virtual reality headset 1032. In outside-in tracking, the tracking camera may track the location of the virtual reality headset 1032 (e.g., by tracking one or more infrared LED markers on the virtual reality headset 1032). Alternatively or additionally, the client system 1030 may make use of inside-out tracking, in which a tracking camera (not shown) may be placed on or within the virtual reality headset 1032 itself. In inside-out tracking, the tracking camera may capture images around it in the real world and may use the changing perspectives of the real world to determine its own position in space.

Third-party content 1040 may include a web browser and may have one or more add-ons, plug-ins, or other extensions. A user at a client system 1030 may enter a Uniform Resource Locator (URL) or other address directing a web browser to a particular server (such as server 1062, or a server associated with a third-party system 1070), and the web browser may generate a Hyper Text Transfer Protocol (HTTP) request and communicate the HTTP request to server. The server may accept the HTTP request and communicate to a client system 1030 one or more Hyper Text Markup Language (HTML) files responsive to the HTTP request. The client system 1030 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 1060 may be a network-addressable computing system that can host an online social network. The social-networking system 1060 may generate, store, receive, and send social-networking data, such as, for example, user-profile data, concept-profile data, social-graph information, or other suitable data related to the online social network. The social-networking system 1060 may be accessed by the other components of network environment 1000 either directly or via a network 1010. As an example and not by way of limitation, a client system 1030 may access the social-networking system 1060 using a web browser of a third-party content 1040, or a native application associated with the social-networking system 1060 (e.g., a mobile social-networking application, a messaging application, another suitable application, or any combination thereof) either directly or via a network 1010. In particular embodiments, the social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, the social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, the social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. The social-networking system 1060 may provide users of the online social network the ability to communicate and interact with other users. In particular embodiments, users may join the online social network via the social-networking system 1060 and then add connections (e.g., relationships) to a number of other users of the social-networking system 1060 whom they want to be connected to. Herein, the term "friend" may refer to any other user of the social-networking system 1060 with whom a user has formed a connection, association, or relationship via the social-networking system 1060.

In particular embodiments, the social-networking system 1060 may provide users with the ability to take actions on various types of items or objects, supported by the social-networking system 1060. As an example and not by way of limitation, the items and objects may include groups or social networks to which users of the social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 1060 or by an external system of a third-party system 1070, which is separate from the social-networking system 1060 and coupled to the social-networking system 1060 via a network 1010.

In particular embodiments, the social-networking system 1060 may be capable of linking a variety of entities. As an example and not by way of limitation, the social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating the social-networking system 1060. In particular embodiments, however, the social-networking system 1060 and third-party systems 1070 may operate in conjunction with each other to provide social-networking services to users of the social-networking system 1060 or third-party systems 1070. In this sense, the social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 1060 also includes user-generated content objects, which may enhance a user's interactions with the social-networking system 1060. User-generated content may include anything a user can add, upload, send, or "post" to the social-networking system 1060. As an example and not by way of limitation, a user communicates posts to the social-networking system 1060 from a client system 1030. Posts may include data such as status updates or other textual data, location information, photos, videos, links, music or other similar data or media. Content may also be added to the social-networking system 1060 by a third-party through a "communication channel," such as a newsfeed or stream.

In particular embodiments, the social-networking system 1060 may include a variety of servers, sub-systems, programs, modules, logs, and data stores. In particular embodiments, the social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 1060 may also include suitable components such as network interfaces, security mechanisms, load balancers, failover servers, management-and-network-operations consoles, other suitable components, or any suitable combination thereof. In particular embodiments, the social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 1060 to one or more client systems 1030 or one or more third-party systems 1070 via a network 1010. The web server may include a mail server or other messaging functionality for receiving and routing messages between the social-networking system 1060 and one or more client systems 1030. An API-request server may allow a third-party system 1070 to access information from the social-networking system 1060 by calling one or more APIs. An action logger may be used to receive communications from a web server about a user's actions on or off the social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from a client system 1030 responsive to a request received from a client system 1030. Authorization servers may be used to enforce one or more privacy settings of the users of the social-networking system 1060. A privacy setting of a user determines how particular information associated with a user can be shared. The authorization server may allow users to opt in to or opt out of having their actions logged by the social-networking system 1060 or shared with other systems (e.g., a third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
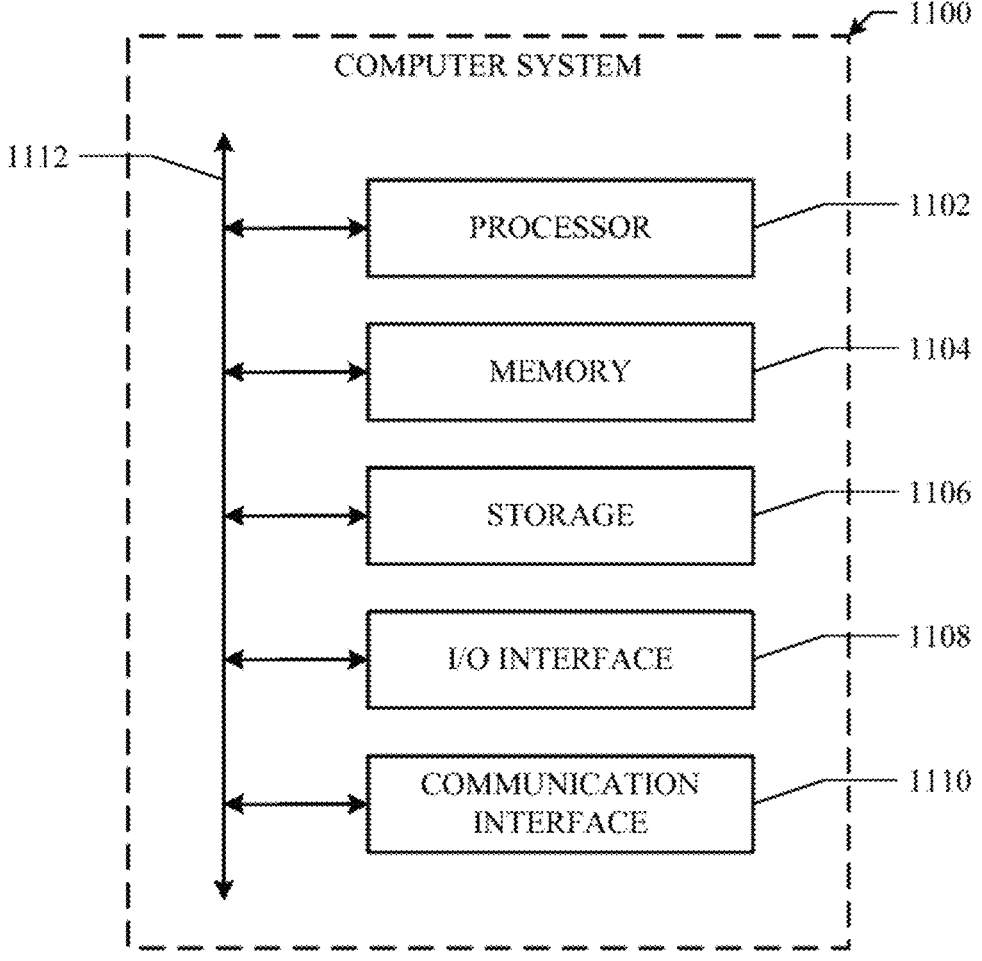
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system

1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

generating, using a machine-learning model, a first image of a first portion of a face of a user from a first viewpoint, and a second image of a second portion of the face of the user from a second viewpoint, a synthesized image corresponding to a third portion of the face of the user as viewed from a third viewpoint, wherein the third viewpoint is different from the first viewpoint and the second viewpoint;

generating a texture image for the face of the user by projecting at least the synthesized image onto a 3D facial model from a predetermined camera pose that captured a ground-truth image for training the machine-learning model;

reprojecting the texture image onto the 3D facial model at the predetermined camera pose, the predetermined camera pose representative of a position of a camera that captured the ground-truth image; and causing an output image of a facial representation of the user.

2. The method of claim 1, wherein the first, second, and third viewpoints are different viewpoints.

3. The method of claim 1, wherein the generating of the synthesized image comprises: compiling the first image and the second image into the synthesized image from the third viewpoint.

4. The method of claim 1, further comprising training the machine-learning model, wherein the training of the machine-learning model comprises:

accessing multiple sets of images corresponding to different portions of a plurality of faces of a plurality of users; and processing, using the machine-learning model, each set of the multiple sets of images corresponding to a respective particular portion of the face of a particular user, wherein the processing comprises:

generating, using the machine-learning model, a particular synthesized image from a desired rendering viewpoint by compiling at least one set of the multiple sets of images, the at least one set corresponding to the particular portion of the face of the particular user;

accessing a particular ground-truth image corresponding to the particular portion of the face from the desired rendering viewpoint; and comparing the particular synthesized image generated using the machine-learning model to the particular ground-truth image.

5. The method of claim 1, further comprising:

blending the texture image with a predetermined texture to generate a second texture image, wherein the output image of the facial representation of the user is generated based on the second texture image and the 3D facial model.

6. The method of claim 5, wherein the second texture image represents a state of the user at a current time.

7. The method of claim 1, wherein causing the output image of the facial representation of the user to be rendered comprises:

sending a rendering package to a second artificial-reality system worn by a second user, the rendering package including (1) the 3D facial model of the user, (2) the texture image for the face of the user, and (3) instructions to render the facial representation of the user based on the 3D facial model and the texture image; and rendering the output image from a viewpoint of the second user with respect to the user using the rendering package.

8. The method of claim 1, further comprising:

accessing a three-dimensional (3D) facial model representative of the face of the user;

identifying one or more facial features in the synthesized image; and selecting the predetermined camera pose based on comparing locations of the one or more facial features in the synthesized image to predetermined feature locations on the 3D facial model.

9. The method of claim 8, further comprising: morphing the 3D facial model based on comparison of the locations of the one or more facial features in the synthesized image to the predetermined feature locations on the 3D facial model.

10. The method of claim 1, wherein the first image is captured from a first camera and the second image is captured from a second camera, each of the first camera and the second camera is located inside of an artificial-reality system worn by the user.

11. The method of claim 1, wherein the 3D facial model is generated by: morphing, based on at least one or more facial features in the synthesized image, a predetermined 3D facial model representative of a plurality of faces of a plurality of users.

12. The method of claim 1, wherein the 3D facial model is a predetermined 3D facial model representative of a plurality of faces of a plurality of users.

13. The method of claim 1, wherein the output image of the facial representation of the user is photorealistic.

14. One or more computer-readable non-transitory storage media embodying software that is operable when executed to:

generate, using a machine-learning model, a first image of a first portion of a face of a user from a first viewpoint, and a second image of a second portion of the face of the user from a second viewpoint, a synthesized image corresponding to a third portion of the face of the user as viewed from a third viewpoint, wherein the third viewpoint is different from the first viewpoint and second viewpoint;

generate a texture image for the face of the user by projecting at least the synthesized image onto a 3D facial model from a predetermined camera pose that captured a ground-truth image for training the machine-learning model;

reproject the texture image onto the 3D facial model at the predetermined camera pose, the predetermined camera pose representative of a position of a camera that captured the ground-truth image; and cause an output image of a facial representation of the user.

15. The media of claim 14, wherein the first, second, and third viewpoints are different viewpoints.

16. A system comprising: one or more processors; and one or more computer-readable non-transitory storage media coupled to one or more of the processors and comprising instructions operable when executed by one or more of the processors to cause the system to:

generate, using a machine-learning model, a first image of a first portion of a face of a user from a first view point, and a second image of a second portion of the face of the user from a second viewpoint, a synthesized image corresponding to a third portion of the face of the user as viewed from a third viewpoint, wherein the third viewpoint is different from the first viewpoint and the second viewpoint;

generate a texture image for the face of the user by projecting at least the synthesized image onto a 3D facial model from a predetermined camera pose that captured a ground-truth image for training the machine-learning model;

reproject the texture image onto the 3D facial model at the predetermined camera pose, the predetermined camera pose representative of a position of a camera that captured the ground-truth image; and cause an output image of a facial representation of the user.

17. The system of claim 16, wherein the first, second, and third viewpoints are different viewpoints.

18. The system of claim 16, wherein the predetermined camera pose is a specific camera pose that captured a ground-truth image used to train the machine-learning model to generate the synthesized image from the third viewpoint.

* * * * *